Figure 1:
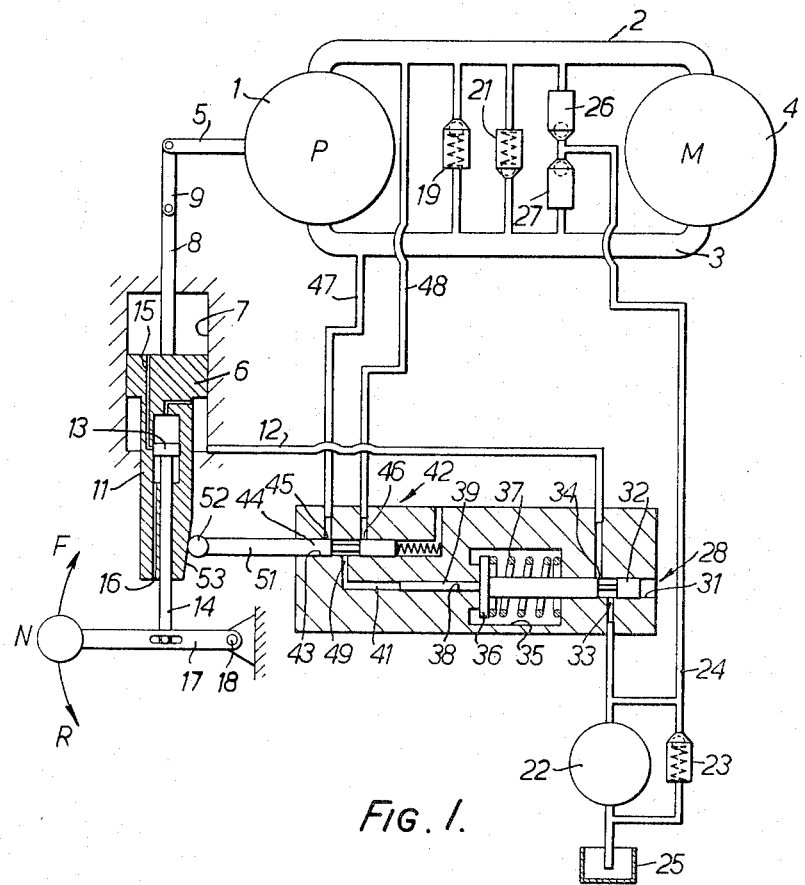

Nov. 16, 1965  B. C. KEMPSON ETAL  3,217,493
HYDRAULIC APPARATUS
Filed June 1, 1964  2 Sheets-Sheet 1

INVENTORS
BERTRAM C. KEMPSON
KENNETH R. BOYDELL
BY Reynolds + Christensen
ATTORNEYS Nov. 16, 1965   B. C. KEMPSON ETAL   3,217,493
HYDRAULIC APPARATUS
Filed June 1, 1964   2 Sheets-Sheet 2

United States Patent Office 3,217,493
Patented Nov. 16, 1965

3,217,493
HYDRAULIC APPARATUS
Bertram C. Kempson, St. Marks, Cheltenham, and Kenneth R. Boydell, Bredons Hardwicke, near Tewkesbury, England, assignors to Dowty Hydraulic Units Limited, near Cheltenham, England, a British company
Filed June 1, 1964, Ser. No. 371,408
Claims priority, application Great Britain, June 6, 1963, 22,578
11 Claims. (Cl. 60—53)

This invention realtes to a hydrostatic power transmission comprising a variable positive displacement pump in hydraulic connection by flow and return pipes with a fixed positive displacement hydraulic motor, the speed ratio between the pump and the motor being variable by adjustment of the relative values of pump and motor displacement. The speed ratio may be defined as the ratio of motor speed to pump speed and is clearly equivalent to the ratio of pump displacement to motor displacement.

A hydrostatic power transmission as described above usually transmits power from the pump to the motor but in many applications of such a transmission there are occasions in the use of the transmission when power is transmitted in the reverse direction from the motor to the pump. An example is a transmission used on a vehicle to transmit power from the vehicle engine to the road engaging wheels. In such a vehicle braking may be attained by the transmission of power from the vehicle wheels to the engine. This may be accomplished during vehicle propulsion by reducing the selected pump displacement. The momentum of the vehicle will then act through the motor and the pump to tend to drive the engine at a higher speed than it would run as a result of the fuel supply to it. During such braking the motor will act as a pump and the pump will act as a motor.

On many occasions it is desirable to provide separate limiting controls for the torques exerted by the transmission motor when it is driving and when it is being driven as for example during braking of a vehicle through its transmission and the object of the present invention is to provide means to enable this result to be attained.

In accordance with the present invention a hydrostatic power transmission comprises a fixed positive displacement motor, a variable positive displacement pump, a pair of passages conveying flow and return liquid between the pump and motor, means for reversing the liquid conveyance functions of the passages to enable forward and reverse rotation of the motor to be selected, a first pressure control responsive to the pressure excess of one passage over the other, irrespective of passage function, to prevent the excess pressure from substantially exceeding a first predetermined value, a second pressure control responsive to the pressure excess of that passage serving the return function, over that serving the flow function, to prevent the latter excess pressure from substantially exceeding a second predetermined value which is lower than the first predetermined value, and a selector valve which is operable by a selection of forward or reverse motor rotation to connect the second pressure control to respond only to the pressure excess of that passage serving the return function over that serving the flow function.

Figure 2:
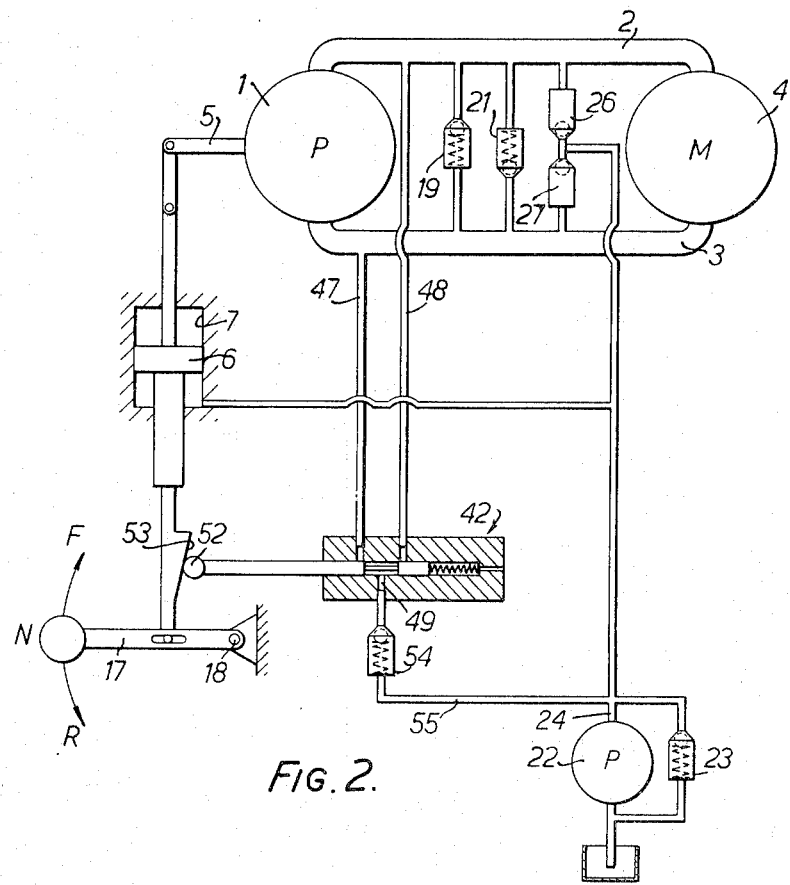
Figure 3:
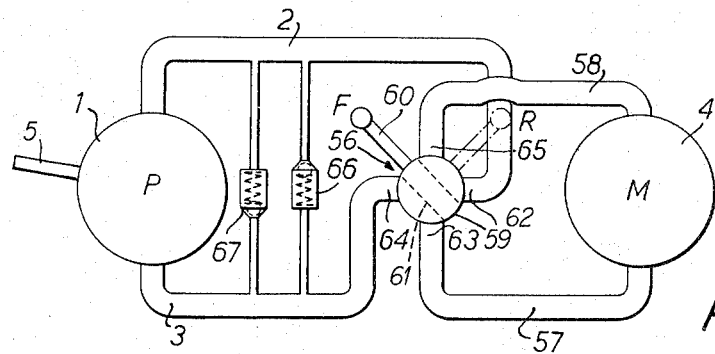

Three embodiments of the invention will now be described with reference to the accompanying diagrammatic drawings, in which FIGURES 1, 2 and 3 illustrate the three embodiments respectively.

Each of the three illustrated embodiments is intended for use on a vehicle for the transmission of power from the engine to the ground engaging wheels.

Referring now to FIGURE 1, a variable and reversible positive displacement pump 1 driven by the vehicle engine is connected through a pair of passages 2 and 3 to a fixed positive displacement hydraulic motor 4, which is connected to drive the vehicle ground engaging wheels. The pump, the motor and the two passages comprise the hydrostatic transmission. A lever 5 extends from the pump 1 and is connected internally of the pump for adjusting pump displacement. The lever is movable continuously between a maximum forward displacement through zero displacement to maximum reverse displacement. For adjusting the lever 5 a servo piston 6 mounted in a cylinder 7 is connected by piston rod 8 and pivoted link 9 to the lever 5. The piston rod 8 is of small diameter in comparison with a plunger 11 which projects on the opposite side of the piston 6. The piston rod 8 and the plunger 11 extend in sealed manner throughout the two ends of the cylinder 7. The end of the cylinder 7 through which the plunger 11 extends is effectively of a smaller cross-sectional area and liquid at low pressure is supplied directly through pipe 12 to the end of the cylinder. Within the plunger 11 is located a valve 13 controllable by endwise movement of a rod 14 within the plunger 11. The valve 13 is adapted to connect liquid at low pressure from the end of the cylinder 7 which includes the plunger 11 through a passage 15 to the opposite side of the piston 6 or alternatively to connect this passage 15 to a drain connection indicated at 16. The arrangement is such that upward movement of the rod 14 as illustrated will connect passage 15 to passage 16 and thus connect the upper end of cylinder 7 to drain whereby the pressure supplied to the smaller area under the piston 6 will cause the piston 6 to rise. Such movement of the piston 6 will continue until the rod 14 is held against further movement at which position the valve 13 following movement of the piston 6 will position itself to isolate the liquid contained in the end of cylinder 7 through which piston rod 8 extends, locking piston 6 against movement. Alternatively if the rod 14 is moved downwardly as seen in the drawing it will connect pressure from the lower end of cylinder 7 through the passage 15 to the upper end of cylinder 7 whereby the piston 6 will move downwardly to a position where the valve closes passage 15 and the liquid in the upper end of cylinder 7 is locked. A servo motor formed by the piston 6 and cylinder 7 and valve 13 and the servo control formed by the rod 14 are all quite well known and further description is thought unnecessary. A manual control lever 17 pivoted at a fixed fulcrum 18 is connected for movement of the servo control rod 14. This lever is movable between full forward and full reverse displacement positions which correspond to a full forward and a full reverse displacement position of the lever 5.

A pair of high pressure spring loaded relief valves 19 and 21 are connected in opposite senses between the two transmission passages 2 and 3. Both of these relief valves are set to open at the same pressure difference between the two passages 2 and 3 although of course such pressure differences are in the reverse senses. For forward displacement of the pump 1 selected by upward movement of the lever 5 the passage 2 will carry liquid from the pump 1 to the motor 4 and will thus be the flow passage. In this condition the passage 3 will carry return liquid from the motor 4 to the pump 1 and will thus be the return passage. In the forward displacement position the relief valve 19 will respond to excess of pressure of the flow passage over the return passage. In the reverse displacement condition selected by downward movement of the lever 5, the passage 3 becomes a flow passage and passage 2 becomes a return passage. In this case the relief valve 21 will respond to excess pressure in the passage 3 over the passage 2. As previously mentioned the pressures at which the valves 19 and 21 respond are both of the same value. Thus either of the valves 19 or 21 may be the first pressure control.

For priming the transmission with liquid at low pressure a make-up pump 22 is provided which is driven from the vehicle engine. The pump is connected parallel relation with a low pressure by-pass relief valve 23 which will determine a constant pressure within the delivery passage 24 from pump 22. Pump 22 will draw liquid from a reservoir 25. The passage 24 extends to a pair of non-return valves 26 and 27 which are connected one to each of the passages 2 and 3. The passage 2 or 3 at higher pressure will maintain its associated non-return valves 26 or 27 in a closed condition and low pressure liquid delivered through the passage 24 will enter passage 2 or 3 at lower pressure through the associated non-return valve 26 or 27. Servo liquid is supplied to the passage 12 through a spool valve 28 comprising a cylinder 31, a waisted valve member 32 and a pair of ports 33 and 34. The passage 12 extends from the port 34 and is normally unclosed by the valve member 32. The valve member 32 extends into a chamber 35 where it is secured to a spring end cap 36. A spring 37 in the chamber 35 acts on the end cap 36 to hold valve member 32 in the position as shown, in which liquid can flow freely from delivery 24, port 33, port 34 into the passage 12.

From the end of chamber 35 opposite to the valve 28 a small diameter cylinder 38 extends within which is located a piston 39, which is adapted to press against the spring end cap 36 when liquid pressure is supplied to the cylinder 38 through a passage 41. The passage 41 is fed from a valve 42 forming a selector valve. This valve comprises a cylinder 43 and a waisted valve member 44 within the cylinder 43. A pair of ports 45 and 46 enter the wall of the cylinder 43 and are connected by passage 47 and 48 with the two passages 3 and 2 of the transmission. A port 49 extends from the cylinder 43 at a position always in communication with the waisted part of the valve 44 and leads to passage 41. A plunger 51 extends through one end of the cylinder 43 and terminates in a roller 52 which engages an inclined surface 53 of plunger 11. The arrangement is that with selection of forward pump displacement by raising the lever 17, the piston valve 44 will move to the left as seen in the drawing to connect the passage 3 through pipe 47, port 45 and port 49 to act on the plunger 39. When forward displacement is selected the passage 3 is a return passage. Alternatively if reverse displacement is selected by downward movement of the lever 17, piston 44 is urged to the right as seen in the drawing and will connect passage 2 through pipe 48, port 46 and port 49 to act on the piston 39.

In operation of the transmission as shown in FIGURE 1 for propulsion of the vehicle the lever 17 is moved in the appropriate direction either for forward or reverse displacement. If during propulsion the pressure in the passage 2 rises excessively having regard to the low pressure maintained in the return passage 3, the relief valve 19 will open to prevent substantially further increase in excess pressure. This in turn will limit the driving torque which can be exerted by the motor 4 in the propulsion of the vehicle. If during driving forwardly the driver wishes to brake, he will move his lever 17 towards the neutral position to reduce pump displacement. When this occurs the momentum of the vehicle acting through the motor 4 as a pump and the pump 1 as a motor will tend to drive the vehicle engine at a greater speed than that determined by the fuel flow to it, and the engine will thus brake the vehicle. Since forward displacement is selected, passage 3 will be connected by the valve 42 to the cylinder 38. The action of braking which turns motor 4 into a pump will cause the passage 3 to rise to a substantial pressure over and above the now low pressure existing in the passage 2 and this high pressure will thus be fed to act on the plunger 39. If this pressure reaches a sufficient value so that the force produced on plunger 39 overcomes the loading of spring 37 the valve member 32 will be moved to throttle the flow of servo liquid into the passage 12 to operate the servo piston 6. Thus further reduction of pump displacement will either be complete prevented or considerably limited. The pressure at which the plunger 39 overcomes the loading of the spring 37 is arranged to be less than the pressure at which the relief valve 19 opens. In this embodiment the relative pressures at which piston 39 moves and at which valve 19 opens are so determined that the torque exerted by the motor drive shaft is at a maximum value in each case. Since the motor must have some frictional resistance to movement, it will be clear that the pressure supplied to the pipe 2 to give a maximum driving torque on the drive shaft of the motor 4 will be greater than the pressure developed by the motor for acting as a pump when the same maximum torque is applied to the motor drive shaft. In this way by suitable arrangement of the pressures of response of the piston 39 and the relief valve 19 it is possible to arrange that during driving or braking the torque exerted on the motor drive shaft will not exceed substantially a predetermined maximum value.

If the vehicle is selected for reverse propulsion by downward movement of the lever 17 the flow passage of the transmission will now be passage 3 and the return passage will be the passage 2. Such downward movement of the lever 17 will cause movement of the valve member 44 to connect passage 2 through passage 48 and port 46 to act on the piston 39. In driving during reverse the pressure relief valve 21 will now be the first pressure control which will open at the predetermined pressure difference between the pipe lines to prevent substantial pressure increase over the maximum. When braking in reverse the lever 17 is moved towards the neutral position in which case inertia of the vehicle will act through the motor 4 as a pump and the pump 1 as a motor to drive the vehicle engine at greater than the speed resulting from the fuel fed to it. As described with reference to forward propulsion the return flow passage will now be at pressure and such pressure will be fed to act on the piston 39. If the excess of pressure in the return passage 2 over and above the pressure in the supply passage 3 exceeds a value determined by the loading of the spring 37 the valve 32 will move as previously described to limit or to completely prevent flow of servo liquid to the servo piston and cylinder 6 and 7 and so prevent or limit further reduction towards neutral of the pump displacement.

Reference is now made to FIGURE 2 of the accompanying drawings.

The embodiment in this figure has a number of similarities to the embodiment described in FIGURE 1 and where possible similar reference numerals will be employed. As described with reference to FIGURE 1 the transmission comprises a pump 1, a motor 4 and a pair of interconnecting passages 2 and 3. The pump is adjusted by lever 5 which in turn is controlled by a servo motor comprising piston 6 and cylinder 7. As described with reference to FIGURE 1 movement of the piston is controlled through a control rod 14 adjusted by a manual lever 17. One difference from the embodiment of FIGURE 1 is that the inclined surface 53 with which roller 52 and valve 42 co-operates is formed on the rod 14 rather than on the plunger 11. As in FIGURE 1 the first pressure control means is comprised by either of two spring-loaded pressure relief valves 19 and 21. It will operate alternatively depending on whether forward or reverse displacement of the pump is selected. The make-up pump 22 includes a parallel connected low pressure relief valve 23 and liquid delivered to its delivery 24 is fed solely to the non-return valves 26 and 27 which feed the transmission passages 2 and 3. The port 49 of the valve 42 is in this figure connected to a spring-loaded pressure relief valve 54 which in this embodiment forms the second pressure control. The loading of the valve 54 is arranged to be lower than the loadings of either the valves 19 or 21.

The transmission of FIGURE 2 is intended for use on a vehicle to transmit power from the engine to the ground engaging wheels. As described with reference to FIGURE 1 the pressure relief valves 19 or 21 operate during driving in either the forward or the reverse sense to limit the pressure excess in the flow passage substantially to a high predetermined value.

During braking in either forward or reverse by reducing pump displacement towards the neutral position the relief valve 54 is connected to the passage 2 or 3 which is acting as the return flow passage and will respond by opening to permit flow of liquid when the pressure excess in the return passage over the flow passage is greater than the setting of the spring loading. The flow from the valve 54 will pass through the pipe 55 into the passage 24 and will enter the transmission through one or the other of the non-return valves 26 or 27 in connection with the passage 2 or 3 acting as the flow passage. It will be seen that in this embodiment the selector valve means comprises a valve 42 and the non-return valves 26 and 27 since these co-operate to connect the second pressure control 54 into its operative position.

As described with reference to FIGURE 1 the pressure loading of the second pressure control 54 is less than the pressure loading of either the valves 19 or 21 forming the first pressure control so that during driving or braking in forward or reverse the maximum torque that may be exerted in the drive shaft of the motor does not exceed substantially a predetermined value.

Reference is now made to FIGURE 3 of the accompanying drawings.

In this figure the transmission is comprised by the pump 1, the motor 4, flow and return passages 2 and 3 extending from the pump 1 to a reversing valve 56 and a pair of passages 57 and 58 extending from the valve 56 to the motor 4. The pump in this embodiment is not of reversible displacement but is merely adjustable between zero and maximum displacement in one direction only. It is arranged that the flow passage 2 from the pump 1 always carries liquid from the pump and that the return passage 3 into the pump always carries liquid into the pump. The reversing valve is of a conventional nature comprising a cylinder 59 within which a plug 61 is rotatably mounted, rotation being controlled by a lever 60 movable in between forward and reverse positions. The reverse position is shown by dotted lines. Four ports 62, 63, 64 and 65 respectively from the passages 2, 57, 3 and 58 open into the cylinder 59. In the forward position as shown the port 62 is connected to the port 65 and the port 63 is connected to the port 64. In this way the flow passage 2 is connected to the passage 58 and the return passage 3 is connected to the passage 57. In the alternative position of the plug 61 for reverse propulsion the port 64 is connected to the port 65 and the port 63 is connected to the port 62 so that flow passage 2 is connected to the passage 57 of the motor and the return passage 3 is connected to the pasasge 58 of the motor. In this embodiment the first pressure control comprises a spring-loaded relief valve 66 connected between the flow and return passages 2 and 3 to carry liquid from the passage 2 to the passage 3 when the excess of pressure is more than a predetermined value. The second pressure control comprises a spring-loaded relief valve 67 also connected between the passages 2 and 3 but in the opposite direction so as to carry liquid from the passage 3 to the pasage 2 and pressure in the passage 3 exceeds pressure in the pasage 2 by more than a predetermined value. The pressure at which the valve 67 opens is less than the pressure which the valve 66 opens.

This embodiment is also intended for use in the propulsion of a vehicle and is located on the vehicle to transmit power from the engine to the ground engaging wheels. For forward or reverse propulsion the handle 60 is moved accordingly. Vehicle speed is adjusted by moving the pump control lever 5 from its neutral towards its maximum displacement position. In this condition the higher pressure will exist in the flow passage 2 and if this pressure becomes excessive having regard to the low pressure in the passage 3 the valve 66 will open to permit flow of liquid to prevent substantial excess of pressure in the passage 2 over and above a predetermined value. During braking of the vehicle, lever 5 will be moved towards the zero displacement position and the momentum of the vehicle acting through the pump 1 will cause a greater pressure to be generated in the return passage 3. The relief valve 67 will prevent this pressure from exceeding a predetermined value, which is lower than the value at which the valve 66 opens. As described with reference to FIGURES 1 and 2 the relative pressure settings of the two valves 66 and 67 is such that during driving or braking the action of the relief valves 66 and 67 is such as to prevent a maximum torque in the motor drive shaft from being substantially exceeded. In the FIGURE 3 embodiment the conventional make-up pump and transmission priming means have been omitted for simplicity.

We claim as our invention:

1. A hydrostatic power transmission comprising a fixed positive displacement motor, a variable positive displacement pump, a pair of passages conveying flow and return liquid between the pump and motor, means for reversing the liquid conveyance functions of the passages to enable forward and reverse rotation of the motor to be selected, a first pressure control responsive to the pressure excess of one passage over the other, irrespective of passage function, to prevent the excess pressure from substantially exceeding a first predetermined value, a second pressure control responsive to the pressure excess of that passage serving the return function, over that serving the flow function, to prevent the latter excess pressure from substantially exceeding a second predetermined value which is lower than the first predetermined value, and a selector valve which is operable by a selection of forward or reverse motor rotation to connect the second pressure control to respond only to the pressure excess of that passage serving the return function over that serving the flow function.

2. A hydrostatic power transmission as claimed in claim 1 wherein the pump is of reversible displacement so as to reverse the liquid conveyance functions of the passages.

3. A hydrostatic power transmission as claimed in claim 2 wherein the first pressure control comprises a pair of spring-loaded relief valves, each set to the same predetermined pressure and oppositely connected across the passages.

4. A hydrostatic power transmission as claimed in claim 2 including a servo motor for control of pump displacement wherein the selector valve is operable by the servo motor.

5. A hydrostatic power transmission as claimed in claim 2 including a servo motor control of pump displacement wherein the selector valve is operable by the servo motor control.

6. A hydrostatic power transmission as claimed in claim 2 wherein the second pressure control comprises a spring-loaded pressure relief valve, and the selector valve includes a positively operable valve to select the passage having the return flow function for connection to the relief valve, and a pair of non-return valves connected to carry flow of liquid from the relief valve to the two passages, the relative pressures in the passages ensuring that the flow from the relief valve can only enter the passage having the flow function.

7. A hydrostatic power transmission as claimed in claim 1 wherein one of the passages has one portion thereof connected with the pump outflow and another portion thereof connected with the motor, and the other passage has one portion thereof connected with the pump return and another portion thereof connected with the motor, and the selector valve takes the form of a reversing valve which is operable to reverse the liquid conveyance functions of the other portions of the passages with respect to the motor, while maintaining the respective functions of the one portion thereof with respect to the pump.

8. A hydrostatic power transmission as claimed in claim 7 wherein the first pressure control comprises a spring-loaded relief valve connected to carry liquid from the pump outflow portion of the one passage to the pump return portion of the other passage, and the second pressure control comprises a spring loaded relief valve connected to carry liquid in excess of the second predetermined pressure from the pump return portion of the other passage to the pump outflow portion of the one passage.

9. A hydrostatic power transmission as claimed in claim 1 wherein the second pressure control responds to excess pressure over the second predetermined pressure by preventing or limiting the rate of reduction of transmission pump displacement.

10. A hydrostatic power transmisison as claimed in claim 4 wherein the second pressure control responds to excess pressure over the second predetermined pressure by limiting the supply of servo power to the servo motor.

11. A hydrostatic power transmission as claimed in claim 5 wherein the second pressure control responds to excess pressure over the second predetermined pressure by limiting the supply of servo power to the servo motor.

References Cited by the Examiner
UNITED STATES PATENTS 2,572,749  10/1951  Noordeman _____ 60—52 X
2,741,895  4/1956  Horvath _____ 60—53

SAMUEL LEVINE, *Primary Examiner.*
EDGAR W. GEOGHEGAN, *Examiner.*